United States Patent Office 3,130,055
Patented Apr. 21, 1964

3,130,055
FLAVOR CONTROL OF MALT BEVERAGES
Edward Segel and Paul Robson Glenister, Chicago, Ill., assignors to J. E. Siebel Sons' Company, Inc., Chicago, Ill., a corporation of Illinois
No Drawing. Filed Oct. 30, 1962, Ser. No. 234,241
10 Claims. (Cl. 99—48)

This invention relates to malt beverages of uniform and pleasant flavor, and a method of manufacture of such beverages.

In the production of malt beverages such as beer and ale, an extract made from the action of water on malt, cereals and hops is fermented by the action of yeast. Fermentation results in a carbonated alcoholic beverage with a characteristic pleasant flavor and aroma, highly prized by consumers of such beverages.

In the present specification, the word "beer" is used to include the entire class of carbonated alcoholic malt beverages.

It is necessary to exercise rigid control of every stage of manufacture in order to obtain a malt beverage with the desired characteristics, and in order to avoid the introduction of any extraneous flavors or aromas which would detract from the desirability of the final beverage. The brewer must carefully select suitable malt, cereal grains, and hops, must often pretreat and purify the water used in brewing, and must carefully select and preserve the strain of yeast used for fermentation. Variables such as temperature must be carefully controlled, and all operations must be carried out under biologically clean conditions, to prevent introduction of off-flavors in the finished product.

Despite the most careful attention by the brewer, both as to the quality of the ingredients used in the production of beer and as to the conditions under which the various operations of manufacture are effected, it is found that, more or less frequently, flavors or aromas or both occur in the beverage during the course of its manufacture which detract from potability and sales appeal. Much time and effort may be expended by a brewer in attempts to find and eliminate the cause of any specific outbreak of such "off-flavors" in his brewery.

In some instances, the unwanted characteristic may be traced to a specific cause, such as yeast infection by bacteria, causing a "lactic" or "rancid" taste; a papery flavor, due to unwanted oxidation; a scorched flavor, caused by overpasteurization; a "skunky" flavor, due to photo-chemical reactions; a metallic flavor, due to abnormally high iron content of the beer, etc. These various off-flavors can be controlled or eliminated by appropriate corrections in the manufacturing process.

It is well known that beers may on occasion have a characteristic buttery odor and flavor, which characteristic is very objectionable to the consumer. It is further known that this undesirable characteristic is attributable to the presence of abnormal quantities of diacetyl.

Diacetyl is produced in the preparation of beer during the fermentation process. Normally, this production of diacetyl takes place during the earlier stages of fermentation, and during the latter stages, diacetyl concentration decreases to unobjectionable values, desirably about 0.05–0.15 p.p.m. No objectionable flavor characteristic detectable to the average beer drinker is imparted to beer below about 0.25 p.p.m.

However, it is not uncommon to find either that the desired decrease in diacetyl concentration during the latter stages of fermentation does not occur, or that, while the diacetyl level does decrease to a satisfactory level at the end of fermentation, the value increases subsequently. In either instance, the finished beer is objectionable in taste, with an adverse effect on sale of the product. Finished beers with diacetyl concentrations ranging from 0.30 p.p.m. to 0.60 p.p.m. are not uncommon, and values ranging up to about 1 p.p.m. are occasionally encountered. As already mentioned, beer containing more than about 0.25 p.p.m. are noticeably off-flavor; beers with diacetyl concentrations above about 0.40 p.p.m. are completely unacceptable to discriminating consumers.

The causes for these fluctuations in diacetyl concentrations of finished beer are poorly understood. It is believed that contamination by bacteria of the yeast used for fermentation may be a factor; some strains of yeast may have an abnormal metabolism, one of the effects of which is to give abnormally high amount of diacetyl; compounds such as acetoin, normally present in beer without adverse effect on taste, may be chemically oxidized to diacetyl.

In accordance with these beliefs, measures have been adopted in breweries in an attempt to prevent or minimize production of beer with high diacetyl concentrations. Thus, if it is believed that yeast contamination is a factor, the yeast may be treated with phosphoric acid or tartaric acid or with antibiotics, or fresh "uncontaminated" yeast may be purchased and used, or yeast cells free from bacteria may be isolated in the laboratory and propagated to give sufficient yeast for brewery use. If oxidation is thought to be a factor, the beer may be treated with reducing agents such as sulfites or ascorbates, or the beer may be kept in contact with yeast for as long as practicable. However, these remedies are often found to be valueless, and the brewer may then resort to desperate measures, such as treatment with activated carbon, which may remove not only the diacetyl off-flavor, but also desirable flavor constituents, or he may blend the beer with normal beer, or he may be forced to discard the beer.

The present state of the art is such that no reliable method is known to prevent the formation of undesirable concentrations of diacetyl in beer, or to reduce such concentrations once formed.

This invention has as its object the preparation of beer free of the undesirable odor and flavor imparted to it by diacetyl.

Another object of this invention is a method for keeping the diacetyl content of beer at appropriately low concentrations under a variety of brewing conditions.

Still another object of this invention is to provide a method whereby undesirably high concentrations of diacetyl are prevented from forming during the manufacture of beer.

Yet another object of this invention is to provide a simple method for lowering the diacetyl content of beer without affecting any other character of the beer.

We have discovered that diacetyl in beer can be controlled or reduced to any desired level, or completely eliminated, by addition thereto of an appropriate purified enzyme extract, to which enzyme we have given the name "diacetyl desmolase."

Various types of enzymes have been used in beer production to accomplish certain specific functions. Thus, for example, it is well known that enzymes of the class known as proteases are useful in chillproofing beer, that is, in preventing hazes from forming in cold beer. Such uses for enzymes are extremely specific; that is, only a particular class of enzymes can be used to accomplish a desired function. In the example cited, only the class of enzymes known as proteases will serve to hydrolyze the proteins which cause chill haze in beer; other enzymes are valueless for this purpose. Conversely, proteases are useful only to hydrolyze these proteins; they have no effect on other properties of beer.

This specificity of enzymes is of great value, if an enzyme can be found to accomplish a useful function in beer, since that function can then be accomplished with no effect on other properties of the beer.

Heretofore, no method for controlling the diacetyl content of beer by the use of an enzyme system has been known. The concept of an enzyme extract to decrease the diacetyl content of beer is especially novel, inasmuch as the presence of diacetyl in beer is due at least in part to enzyme systems arising from bacteria and yeasts unavoidably present in beer. It is, therefore, surprising to find that an enzyme can be used to do the exact opposite of what normally occurs.

We have discovered that certain enzyme extracts have the specific effect of destroying diacetyl in beer, without affecting any other property of beer. As noted hereinbefore, we have termed the enzyme in these extracts "diacetyl desmolase."

Diacetyl desmolase is apparently widely distributed in the plant and animal kingdoms.

This enzyme is conveniently isolated from, among others, growth cultures of bacteria such as *Aerobacter aerogenes, Staphylococcus aureus, Neisseria winogradskyi, Pseudomonas fragi,* and *Streptococcus diacetilactis,* from suitable strains of the yeast *Saccharomyces cerevisiae,* from wheat germ, from pigeon breast muscle, from beef liver, and from pig heart muscle. The most suitable source will, of course, depend on economic considerations.

Suitable methods of isolation of the enzyme from any particular source of the enzyme can be readily devised by skilled enzymologists. Two examples of suitable isolation techniques are described below.

*Example I*

*Streptococcus diacetilactis* is incubated for 20 hours at 30° C. in an aqueous broth medium approximately of the following composition: 1% tryptone, 1 to 2% sodium citrate dihydrate, 1% glucose, 0.5% yeast extract, 0.1% dibasic potassium phosphate, 0.1% magnesium sulfate. The broth is adjusted to pH 7.0 with hydrochloric acid and autoclaved for 15 minutes at 121° C. before inoculation.

After the incubation period, the cells are harvested by centrifugation, washed twice in 0.1 molar pH 7.0 phosphate buffer, and the cells then broken up sonically by exposure for 15 minutes to a Raytheon 10 kilocycle oscillator. Cell debris is removed centrifugally.

The resultant extract is suitable for use without further treatment. (It is possible to use the crude mixture containing cell debris, provided care is taken to remove all debris from the beer by filtration.) Alternatively, the enzyme can be "freeze-dried," to give a relatively stable dry powder rich in diacetyl desmolase.

*Example II*

Minced pig heart muscle is homogenized in β-glycerophosphate buffer, which extracts the enzyme, and then centrifuged. The cloudy supernatant liquid is adjusted to pH 4.6 with 10% acetic acid, precipitating the enzyme. The precipitate is collected by centrifugation. It is the active enzyme, diacetyl desmolase.

It is, of course, to be understood that the foregoing examples are for illustrative purposes and in no way limit either the sources of diacetyl desmolase or the isolation techniques useful in its production.

The mode of action of diacetyl desmolase in destroying diacetyl may depend on the particular source used for isolation of the enzyme, but the particular mechanism for destruction affects in no way the practice of this invention.

As can be seen from the preceding examples, diacetyl desmolase employed in the practice of this invention may be used either as an aqueous extract or as a powder.

Addition of diacetyl desmolase for the control of diacetyl content of beer may be made to cold hopped wort or to any stage of beer production subsequent thereto.

Diacetyl desmolase addition made during the latter stages of fermentation acts to prevent subsequent accumulation of diacetyl in the beer. Such additions made routinely in a brewery lead to consistently clean flavor in every brew. Diacetyl desmolase may, however, also be added to beer in any stage of the finishing process subsequent to fermentation and prior to packaging, to remove diacetyl flavor that may have developed during the aforesaid finishing process. It may also be desirable in some instances, to give a "split" treatment; that is, an addition of diacetyl desmolase to hopped wort or to fermenting beer, with a further addition subsequent thereto. Judgment of the timing of addition of the enzyme is readily made by those skilled in the art of brewing, as judged by the persistence and severity of the diacetyl problem encountered in the particular brewery.

The amount of enzyme to be used for the control of diacetyl in beer will depend on a variety of factors, including the potency of the particular diacetyl desmolase employed, the concentration of diacetyl in the beer being treated, the desired diacetyl concentration to which the brewer wishes to bring his beer (which depends in turn upon the flavor characteristics desired for the beer being treated), the temperature of the beer being treated, and the time allowed for the enzyme to act on the beer.

For any particular brewery, the desired level of diacetyl will be well established for each type of beer produced. Since methods for analysis of beer for diacetyl are well known, it is a simple matter for the brewery, by judicious choice of enzyme amount, potency, and time of treatment, to produce a finished beer containing the desired low diacetyl level. Trial experiments may be used initially to "calibrate" the effect of an enzyme treatment, and the experience gained in such trials may then be used to select accurately the correct dosage for a beer containing any diacetyl concentration encountered in practice.

Ordinarily, exceedingly low concentrations of diacetyl desmolase sufficient to bring the diacetyl content of beer down to acceptable values. It is often found, in the practice of this invention, that as little as 1 to 10 p.p.m. diacetyl desmolase is satisfactory, and in mild off-flavors due to diacetyl even traces (less than 1 p.p.m.) of diacetyl desmolase give good control. Where initial diacetyl concentrations are high, or where contact time is short, or where a particularly low level of diacetyl is desired, higher concentrations of diacetyl desmolase may be employed. Since there are no side effects due to the enzyme, and since the enzyme is destroyed during pasteurization, the brewer may use as high a concentration of diacetyl desmolase as is necessary to accomplish the desired removal of diacetyl. The use of diacetyl desmolase gives the brewer great flexibility in that he may use as little or as much as is desirable for his beer. The foregoing does not preclude the use of diacetyl desmolase in so-called "draft" or unpasteurized beer.

The practice of the invention described herein does not require advancing a theoretical explanation of the pathways by which diacetyl desmolase removes diacetyl from beer, nor is such an explanation available. However, as a hypothesis, it would appear likely that oxidation-reduction reactions are involved, such reactions being catalyzed by diacetyl desmolase.

It is well known that enzymes which catalyze oxidation-reduction reactions are generally most effective in the presence of so-called "co-factors," these co-factors being hydrogen or electron carriers, thus facilitating oxidation-reduction. Examples of such co-factors are ascorbic acid, thiamine, DPNH (reduced diphosphopyridine nucleotide), ADP (adenosine diphosphate), ATP (adenosine triphosphate), lipoic acid, and cocarboxylase (diphosphothiamine).

Addition of co-factors is not the essence of this invention, in that beer, after fermentation and prior to pasteurization, usually contains significant quantities of various co-factors of the type described above. It is, therefore, feasible to bring about the desired diminution of diacetyl concentration in beer simply by the addition of diacetyl desmolase. However, dependent upon the particular beer and its content of appropriate co-factors, it may be desirable to add, along with the diacetyl desmolase, slight amounts of suitable co-factors, or, alternatively, small amounts of materials normally present in fermented beer, such as yeast or enzymatic malt extract, which contain such co-factors.

The following examples illustrate the use of diacetyl desmolase in beer, but in no way limit the invention.

*Example III*

A beer when examined during its seventh day of fermentation was found to contain 0.6 p.p.m. diacetyl.

The beer was transferred to a ruh storage tank, leaving most of the sedimented yeast behind in the fermentation vessel. An aqueous solution of powdered diacetyl desmolase prepared from pig heart muscle according to Example II was prepared and metered into the beer during transfer. An amount of powdered diacetyl desmolase sufficient to give 5 p.p.m. in the storage beer was used.

This treated beer was then stored at 1° C. for 5 days, at which time analysis showed a diacetyl content of 0.15 p.p.m. This beer was found to be satisfactory in aroma and flavor, and free of objectionable diacetyl flavor. Subsequent routine cellar and packaging operations gave a satisfactory finished beer.

*Example IV*

A tank of beer when examined on its sixth day of fermentation was found to contain 0.95 p.p.m. diacetyl.

An aqueous extract of diacetyl desmolase prepared from *Streptococcus diacetilactis* according to Example I, and containing sufficient of this enzyme to give 20 p.p.m. when added to the tank of beer described above, was diluted with an equal volume of cold beer, and this mixture was injected into the tank of beer. The contents of the tank were thoroughly mixed by use of a recirculating pump.

The beer was allowed to stand two additional days in the fermenting tank. Analysis for diacetyl at this time indicated a content of 0.4 p.p.m.; a slight diacetyl taste was still detectable.

The beer was then pre-filtered and transferred into ruh storage. An aqueous extract of diacetyl desmolase prepared from *Streptococcus diacetilactis*, and containing sufficient of this enzyme to give an additional 5 p.p.m. when added to the bulk of the beer, was diluted with an equal volume of cold beer, and this mixture was proportioned into the beer line as the beer passed from the pre-filter to the ruh storage tank.

This treated beer was then stored at 2° C. for 7 days, at which time analysis shows a diacetyl content of 0.18 p.p.m. This beer was free of diacetyl flavor and odor, and judged satisfactory as to overall flavor character. Subsequent routine cellar and packaging operations gave a satisfactory finished beer.

*Example V*

A tank of pre-filtered beer in ruh storage had a faint buttery flavor. Diacetyl analysis indicated a content of 0.3 p.p.m. An aqueous solution containing enough powdered diacetyl desmolase prepared from *Streptococcus diacetilactis* and enough DPNH (the reduced form of DPN) to give 1 p.p.m. of each of these materials in the tank of beer was injected into the tank, and thoroughly distributed by a recirculating pump. The beer remained in ruh storage an additional four days at 2° C. At this time the buttery flavor could no longer be detected; diacetyl content was 0.12 p.p.m. Subsequent routine cellar and packaging operations gave a satisfactory finished beer.

*Example VI*

A tank of pre-filtered beer in ruh storage had a diacetyl content of 0.5 p.p.m., and had an objectionable flavor and aroma. Liquid yeast from a tank of fermented beer was injected into this beer at the rate of ¼ pound per barrel, and distributed uniformly by recirculation. An aqueous extract containing enough diacetyl desmolase to give 8 p.p.m. in the tank of beer was diluted with two times its volume of cold beer, was then injected into the tank and distributed by recirculation.

After 4 days of storage at 1.5° C., by which time the yeast had substantially settled to the bottom of the tank, the beer was given a coarse filtration and transferred to a fresh ruh storage tank. Its flavor and aroma were now satisfactory, and its diacetyl content was a satisfactory 0.14 p.p.m. Subsequent routine cellar and packaging operations gave a satisfactory finished beer.

We claim:

1. A method for removing objectionable buttery odor and flavor from beer which comprises adding to said beer a small but effective amount of diacetyl desmolase.

2. A method for lowering diacetyl content of beer which comprises incorporating therewith diacetyl desmolase.

3. A method for lowering diacetyl content of beer which comprises adding a small but effective amount of diacetyl desmolase to beer prior to packaging.

4. The process of claim 3 wherein said enzyme is added to cold hopped wort.

5. The process of claim 3 wherein said enzyme is added during fermentation.

6. The process of claim 3 wherein said enzyme is added after fermentation.

7. The method of claim 3 wherein the enzyme is added in the form of an aqueous extract.

8. The method of claim 3 wherein the enzyme is added in the form of a dry powder.

9. The method of inhibiting formation of diacetyl during manufacture of beer which comprises adding to the beer during manufacture thereof and before packaging an effective amount of diacetyl desmolase.

10. The method of claim 9 which comprises further adding a co-factor.

References Cited in the file of this patent

UNITED STATES PATENTS 2,077,448   Wallerstein _____ Apr. 20, 1937

OTHER REFERENCES

Shimwell et al.: Institute of Brewing Journal, vol. 45, 1939, pp. 137–145. TP500179.

Burger et al.: Institute of Brewing, vol. 64, 1958, pp. 266–267. TP500179.